United States Patent [19]

Stewart

[11] Patent Number: 4,921,647

[45] Date of Patent: May 1, 1990

[54] METHOD OF SHAPING A LAMINATED THERMOPLASTIC BILLET

[75] Inventor: David R. Stewart, Richmond, Tex.

[73] Assignee: Shell Oil Company, Houston, Tex.

[21] Appl. No.: 263,227

[22] Filed: Oct. 27, 1988

[51] Int. Cl.⁵ .......................................... B29B 13/08
[52] U.S. Cl. ...................................... 264/26; 264/512; 264/522; 264/153; 264/322; 425/174.8 E
[58] Field of Search .................... 264/26, 25, 157, 160, 264/152, 153, 322, 510–512, 327, 522; 425/174.8 R, 174.8 E, 384, 388, 503–509, 174, 143, 174.4

[56] References Cited

U.S. PATENT DOCUMENTS

| | | | |
|---|---|---|---|
| 3,488,411 | 1/1970 | Goldman | 264/26 |
| 3,519,514 | 7/1970 | Ignell et al. | 264/512 |
| 3,787,158 | 1/1974 | Brown et al. | 425/388 |
| 3,802,985 | 4/1974 | Leatherman | 264/171 |
| 3,846,522 | 11/1974 | Goldman | 264/25 |
| 3,947,204 | 3/1976 | Ayres et al. | 425/384 |
| 4,005,967 | 2/1977 | Ayres et al. | 425/384 |
| 4,154,893 | 5/1979 | Goldman | 264/327 |
| 4,304,751 | 12/1981 | Li et al. | 264/322 |
| 4,420,670 | 12/1983 | Croswell et al. | 219/10.81 |
| 4,435,244 | 3/1984 | Beck et al. | 156/379.8 |
| 4,441,876 | 4/1984 | Marc | 425/174.8 |
| 4,448,345 | 5/1984 | Helms | 229/43 |
| 4,451,721 | 5/1984 | Nemeskeri | 219/10.43 |
| 4,462,786 | 7/1984 | Perryman | 425/388 |
| 4,512,942 | 4/1985 | Babbin et al. | 264/26 |
| 4,778,551 | 10/1988 | Coffman | 264/152 |
| 4,790,972 | 12/1988 | Coffman | 264/160 |
| 4,810,457 | 3/1989 | Kersting | 264/322 |

FOREIGN PATENT DOCUMENTS 1238881  7/1971  United Kingdom .................. 264/25

*Primary Examiner*—Jeffery Thurlow

[57] ABSTRACT

A laminate having at least one non-dielectrically heatable first material, (processable at an optimum starting temperature), and at least one dielectrically-heatable second material, (processable at a higher optimum finish temperature), is initially brought to its starting temperature. The dielectrically heatable second material is then heated to its finish temperature, by being subjected to radio frequency (RF) or microwave radiation at selected frequency(s). The laminate is then stretched so as to shape the laminate while the first material and second material are at or near to their optimum processing temperatures.

2 Claims, 2 Drawing Sheets

METHOD OF SHAPING A LAMINATED THERMOPLASTIC BILLET

RELATED APPLICATION

This application is related to an application entitled "Mold Press with Dielectric Electrodes", Mr. David R. Stewart inventor, filed Aug. 31, 1988, Ser. No. 239,104.

BACKGROUND OF THE INVENTION

The mechanical properties of thermoplastic articles of manufacture may be improved by stretching the thermoplastic within an optimum temperature range. For example, when producing thermoplastic fibers, it is common to stretch the fiber by drawing the fiber through a die, which reduces the diameter of the fiber and orientes the polymer molecules in the direction of drawing. This is commonly done using rollers. A first roller is temperature regulated so as to hold the temperature of the fiber at the desired temperature and a second roller is run at a speed faster than the first roller in order to stretch the fiber. The temperature at which the fiber is stretched is very important in that it determines the degree of orientation of the polymer molecules and therefore the strength and feel of the fiber.

This same method is used to stretch thermoplastic film(s) or sheet(s) or laminates formed therefrom and again it is important that the temperature be controlled in order to optimize the mechanical properties. As used herein in this specification and the claims, a laminate shall mean a laminated sheet, film, fiber, coaxial fiber, billet, etc.

Blow molding, thermoforming and the solid phase forming processes also require temperature control in order to obtain the correct melt strength and/or orientation during the forming of the article.

This is especially true during the solid phase forming processes since the thermoplastic material must be formed at temperatures just below the melt or softening point of the billet or sheet in order to obtain the optimum properties.

All of the above stretching processes typically involve the use of laminates or coaxial fibers of one or more thermoplastics. Heating the laminate or coaxial fibers and stretching them for any of the stretching processes is done while all of the layers of the thermoplastic are essentially at the same temperature.

Thus, the sheet, billet, or fiber is heated before stretching by applying sufficient thermal energy to the surface of the article to allow the article to reach an essentially even temperature profile (i.e. the temperature profile indicated by line T6 in prior art FIG. 1 where both sides are heated, or indicated by line Ts in prior art FIG. 2 where one side is heated) before stretching.

In most situations, the temperature differences between any two portions of the laminate and the time intervals between heating and stretching are such that all portions of the laminate are essentially at the same temperature during the stretching operation. In fact, it is usually the object of stretching process to get as small a temperature gradient as possible across the cross section of the sheet, film, fiber or billet during its stretching process.

It is possible to obtain a temperature gradient across the cross section of the material by heating the surface of the sheet, film, fiber or billet at a high temperature and stretching immediately. This type of heating will give a temperature profile which resembles that shown by lines T1–T5 in FIG. 1 or T0–T9 in FIG. 2. The line labelled T0 in FIG. 2 describes the temperature profile at the initial stage of heating.

When one has a laminated sheet, film, fiber or billet made of two or more diverse thermoplastics whose optimum process temperatures are different, it is necessary to choose a temperature at which to process the laminate which is either best for one or another of the materials in the laminate or to choose a temperature somewhere between the optimum for each of the materials, i.e. optimum for neither. It is possible that the two materials have such diverse process temperature requirements that it is impossible to find a temperature which is appropriate for stretching. For example, when making containers, it would be desirable to use a laminate which comprises a polypropylene layer positioned adjacent an ethylene/vinyl alcohol copolymer layer. If such a laminate could be thermoformed at the optimum processing temperatures for both thermoplastics the resulting shaped laminate would exhibit excellent strength and impact properties and superior barrier properties. In most instances, however, the container maker is forced into using an ethylene/vinyl alcohol copolymer with a lower than desired vinyl alcohol content in order to get the ethylene/vinyl alcohol copolymer to process at the temperature at which they wish to process the polypropylene.

A process need be developed that allows the different layers of a laminate to be heated to their different optimum processing temperatures, prior to shaping the laminate into the desired article of manufacture. Such a process should allow each individual layer to be quickly heated to a desired narrow temperature range before the stretching process, to prevent the temperatures of adjacent layers from drifting towards one another due to conduction between the layers.

SUMMARY OF THE INVENTION

A laminate having at least one non-dielectrically heatable first material, (processable at an optimum starting temperature), and at least one dielectrically-heatable second material, (processable at a higher optimum finish temperature), is initially brought to its starting temperature. The dielectrically heatable second material is then heated to its finish temperature, by being subjected to radio frequency (RF) or microwave radiation at selected frequency(s). The laminate is then stretched so as to shape the laminate while the first material and second material are at or near to their optimum processing temperatures.

In one embodiment of this invention, a flat laminate formed from a first thermoplastic material layer and a second thermoplastic material layer is brought to the optimum processing starting temperature of the first material, by any heating or cooling method. For example, both laminate layers may be heated to the starting temperature in an infrared, electric resistance, or gas oven, or air-cooled after the layers are extruded. The second material layer is then heated to its optimum processing finish temperature by radio frequency or microwave radiation, such that both layers are at or near to their optimum processing temperature(s).

The laminate is then stretched or formed, before the layer heated to the higher finish temperature has transferred much of its heat to the layer heated to the lower starting temperature. Each laminate layer can be heated to a different temperature prior to the stretching process and a more optimum processing of the two or more layers can be achieved. The field strength of the radio frequency or microwave radiation is adjusted to that needed in order to heat the desired layer(s) from the starting temperature to the final temperature at the desired rate.

The invention provides a method of processing laminates wherein laminates which previously had not been processable may now be processed.

It is therefore an object of the present invention to manufacture articles consisting of shaped thermoplastic laminates having improved mechanical properties.

It is a feature of the present invention to dielectrically heat selected layers of the laminate to their optimum processing temperature immediately prior to stretching the laminate.

These and other features, objects, and advantages of the present invention will become apparent from the following detailed description, wherein reference is made to the Figures in the accompanying drawings.

IN THE DRAWINGS

DETAILED DESCRIPTION

A portion of the layer materials which typically make up the sheet, film, fiber and/or billet laminate is typically selected from polyolefins, such as polypropylene, polyethylene, polybutene, polybutadiene, polyisoprene, and their copolymers. These materials are essentially transparent to RF and/or MW heating and are therefore not heatable by dielectric heating. These materials are combined in the laminate with dielectrically-heatable layer materials formed for example from polyvinyl chlorides, polyvinylidiene chlorides, nylons, polyvinyl alcohols, acrylonitrile, cellulose, etc. which have polar moieties and therefore will heat at certain RF and/or MW frequencies.

Figure 1:
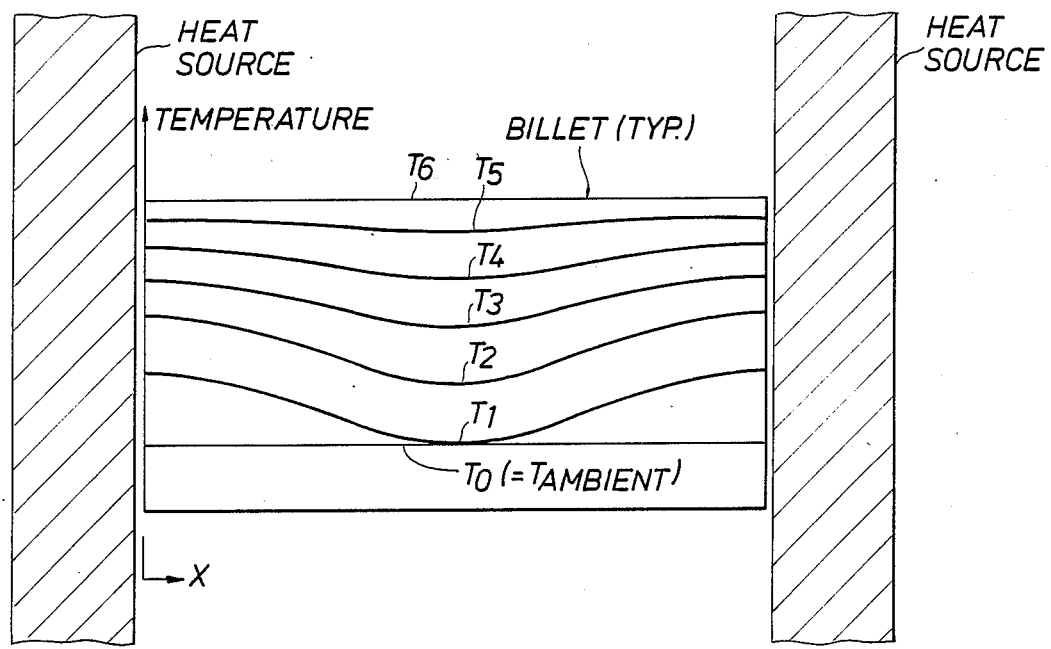
FIG. 1 is a graphical representation of the temperature variation over time of a laminate cross section with heat sources placed at each side.
Figure 2:
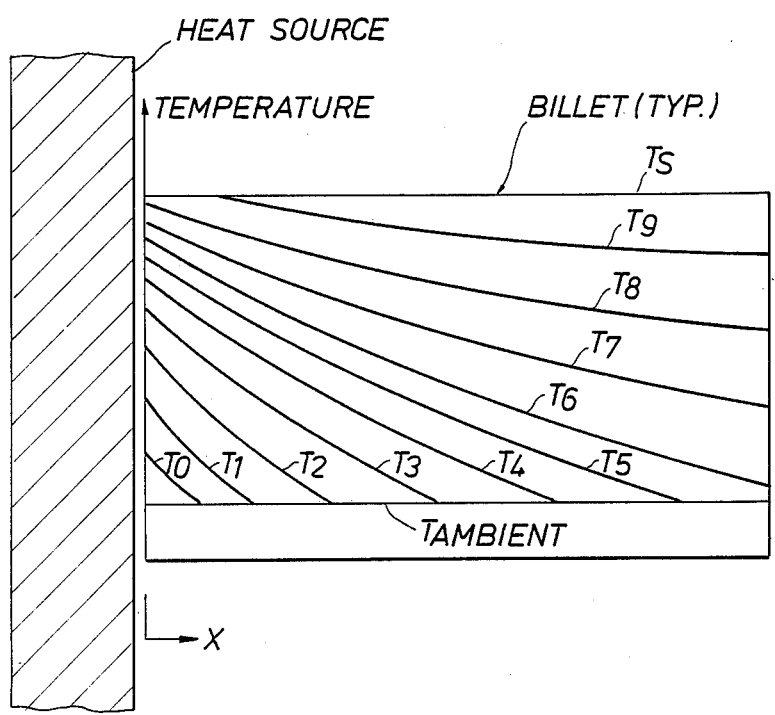
FIG. 2 is a graphical representation of the temperature variation over time of a laminate cross section with one heat source placed at one side.
Figure 3:
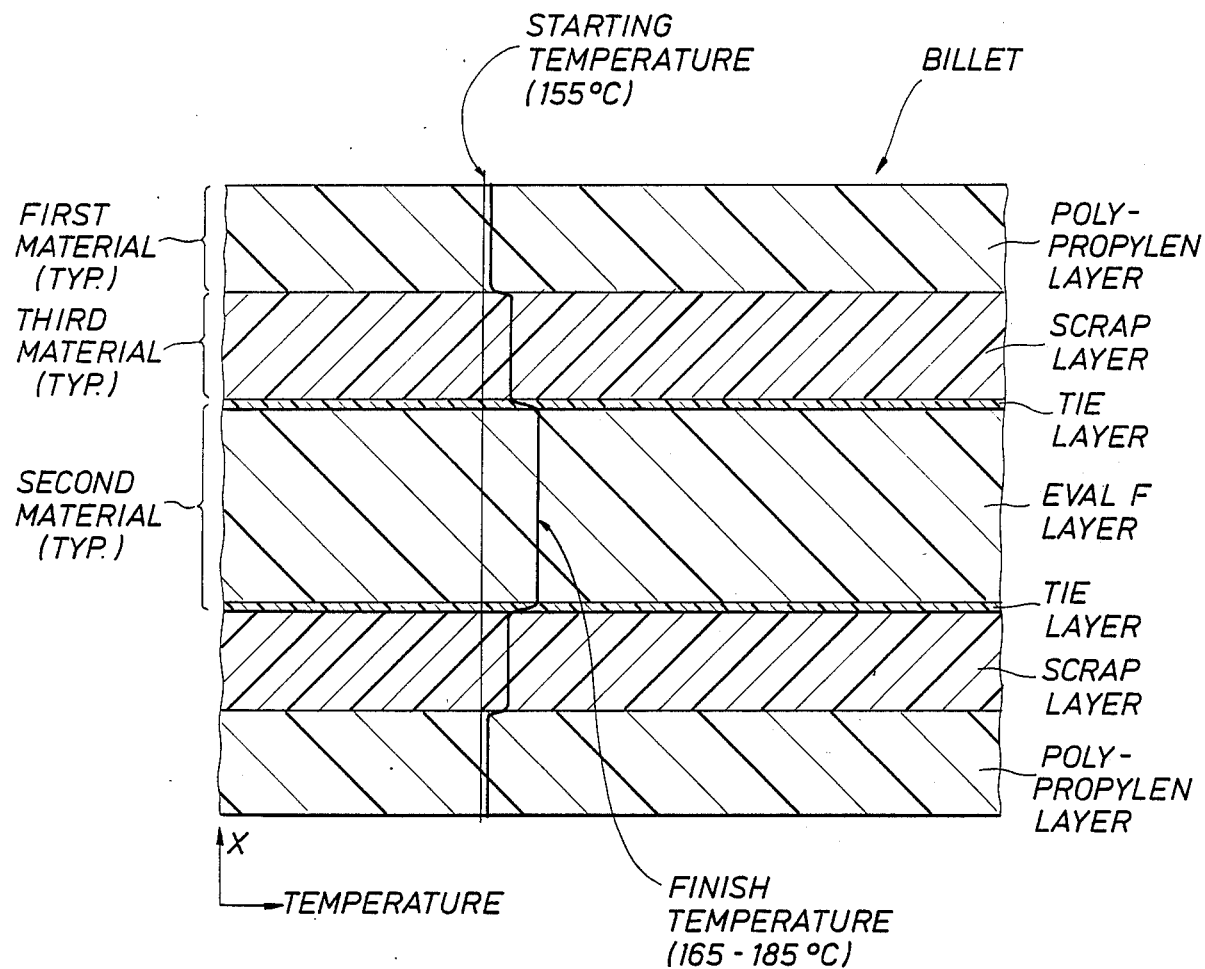
FIG. 3 is a graphical representation of the temperature variation of a laminate cross section when the center EVAL F layer has reached the finish temperature due to dielectric heating.

Referring now to FIG. 3 an example of a laminate layer sequence heatable according to the teachings of the present invention would be a 20 mil layer of polypropylene, a 20 mil scrap layer, a 2 mil adhesive tie layer, a 40 mil EVAL F layer, (EVAL being ethylene vinyl alcohol copolymer), a 2 mil adhesive tie layer, a 20 mil scrap layer and a 20 mil polypropylene layer. The adhesive tie layer material is a propylene/maleic anhydride graft copolymer, and the scrap layer material is a blend of the regrind of all of the materials. This stack of layers can be in the form of a billet which had been stamped (cut) out of sheets of the layer material(s).

In a preferred embodiment the billet is heated in an electric resistance heated oven to the processing temperature of polypropylene, 155° C. It is then transferred to a dielectric heater and irradiated with a frequency of 100 MHz for 20 seconds. At this point the polypropylene layer, which did not heat by dielectric radiation, is at a starting temperature of 155° C. and the EVAL F layer, which did heat dielectrically, is at a finish temperature of 185° C. The billet is then quickly transferred to a solid phase pressure-forming mold and a cup made. At the end of the forming cycle the temperature of the polypropylene layer was between 150° C. and 155° C. and the temperature of the EVAL F layer was between 165° C. and 185 ° F. Thus, the two layers had been stretched at a temperature which resulted in the desired orientation for each layer.

If one had attempted to process this billet at the temperature best for EVAL F, i.e. 170 to 185 ° C., the polypropylene would have been above its melting point, i.e. it would not have been solid phase formed. In fact, it would have been above its best thermoforming or blow molding temperature. If one had tried to process the laminate at 155° C., one would have been so far below the processing temperature of EVAL F that the thermoplastic material would neck and/or tear, thereby destroying the barrier properties of the laminate.

The scrap layer will heat slower than the EVAL F layer because the concentration of the polar -OH moiety is less. The adhesive layer, which contains maleic anhydride moieties, will not heat at the frequency at which the EVAL F layer will heat. The scrap layer and the adhesive tie layer help insulate the polypropylene from the EVAL F.

In another embodiment of this invention, a second polyolefin or second layer may be added to the multilayer laminate to help insulate the dielectrically-heatable layer from the non-dielectrically heatable layer. For example, a polypropylene/ polyethylene/ EVAL F/ polyethylene/ polypropylene laminate can be used where the polyethylene layer insulates the EVAL F and polypropylene from each other.

In another embodiment of the invention, three thermoplastic materials comprising polyvinylidene floride (KYNAR ®), EVAL ®, and polypropylene, are combined to make a laminate whereby frequencies and field strengths can be chosen so that three different temperatures can be obtained in the three different material layers. The laminate so formed can be brought to a starting temperature of 150° C., then a first dielectric radiation field having a first frequency of 30 MHz and a first field strength of 3000 volts/cm, and a second dielectric radiation field having a second frequency of 100 MHz and a second field strength of 5000 volts/cm may be simultaneously applied to the billet so as to heat the KYNAR to a first finish temperature between 170–180° C. and the EVAL to a second finish temperature between 180° C. to 190° C. It is preferred that where there are two different layers that heat dielectrically, that a dielectrically transparent and/or insulating layer separates the two heatable layers.

It is possible to take advantage of the temperature/frequency dependence of the loss factor for a particular polymer so that, for example, a layer of a laminate can be heated at a frequency such that as the temperature goes up, the heat input goes down and a certain minimum temperature is the maximum reachable at that frequency. This could be used to bring the whole laminate to the starting temperature. Then just before one is ready to process, the frequency is changed to one where a layer is known to have a high heat loss so as to kick the temperature of that layer to its preferred finish temperature.

Frequency change with temperature can also be used to increase the rate at which a layer is heated.

It is preferred that the time between starting to kick the temperature of a layer or layers from the starting temperature to the finish temperature be as short as possible. This will minimize the exchange of heat between the layers by conduction. To minimize the heatup time, one may follow the shift of loss factor with temperature by heating at two or more frequencies. Where, for example, two frequencies are used, it is preferred that the first frequency is approximately one of maximum heat gain at the starting temperature and the second frequency is closer to the maximum heat gain at the finish temperature.

When there is some heat exchange between the layers in the time period between kicking the temperature and processing, it is possible to heat the entire laminate to a starting temperature several degrees below the preferred processing temperature of the layer having the lowest processing temperature, and then to dielectrically heat the dielectrically heatable layers to their finish temperature, and then to stretch the laminate. The lower temperature layer will have its temperature raised several degrees by the dielectrically heated layer via conduction.

It should be recognized that the temperature gradient shown in FIG. 3 is novel in that the outside of the sheet, film, fiber or billet is at a lower temperature than the inside.

In another embodiment of the invention, the laminate comprises at least two plastics that will heat at different frequencies, i.e. plastic A will heat at frequency X and not Y and plastic B will heat at frequency Y and not X. This laminate is heated simultaneously at frequencies X and Y at field strengths that will simultaneously bring the two layers to the desired temperature at the same time. That is, the field strength at X and the field strength at Y will be adjusted to heat the layers at a rate such that both layers reach their respective processing temperatures at the same time, i.e. at the moment of processing.

The temperature difference between two adjacent layers at the time of stretching can be between 20 and 30 degrees Centigrade, with or without an insulating layer therebetween.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A process for forming a shaped article of manufacture from a pre-assembled laminate having a dielectrically non-heatable first material and a dielectrically-heatable second material and a dielectrically-heatable third material, said process comprising the steps of;
   bringing said first material, second material, and third material to a starting temperature,
   dielectrically heating said second material to a first finish temperature,
   dielectrically heating said third material to a second finish temperature higher than said first finish temperature,
   shaping said article of manufacture before the temperature of said second material or the temperature of said third material decreases below said starting temperature.

2. The process of claim 1 wherein the steps of;
   dielectrically heating said second material to a first finish temperature, and
   dielectrically heating said third material to a second finish temperature higher than said first finish temperature, are done by;
   simultaneously applying to said second material and said third material a first dielectric radiation field having a firs frequency and a first field strength, and a second dielectric radiation field having a second frequency and a second field strength.

* * * * *